United States Patent
Finn

Patent Number: 5,735,646
Date of Patent: Apr. 7, 1998

[54] INTERRUPTIBLE FEED RATE DRILLING SYSTEM

[75] Inventor: Wayne K. Finn, Torrance, Calif.

[73] Assignee: Excellon Automation Company, Torrance, Calif.

[21] Appl. No.: 532,122

[22] Filed: Sep. 22, 1995

[51] Int. Cl.$^6$ .................................................. B23B 47/18
[52] U.S. Cl. ........................... 408/3; 408/10; 408/17; 408/129; 318/39
[58] Field of Search ......................... 408/3, 8, 10, 11, 408/17, 129; 318/39, 268, 811

[56] References Cited

U.S. PATENT DOCUMENTS

| | | | |
|---|---|---|---|
| 3,446,099 | 5/1969 | Lesher et al. | 408/10 |
| 3,720,135 | 3/1973 | Merner et al. | 408/3 |
| 3,854,837 | 12/1974 | Kreithen et al. | 408/17 |
| 4,780,654 | 10/1988 | Shoji et al. | 318/39 |
| 5,087,157 | 2/1992 | Shoji et al. | 408/17 |

OTHER PUBLICATIONS

Drawings of Chip Breaker tool and double drilling method by R. Gabriel and Wayne K. Finn Jun. 21, 1995.

*Primary Examiner*—Daniel W. Howell
*Attorney, Agent, or Firm*—Henry G. Kohlmann

[57] ABSTRACT

In a system which interrupts the infeed signal generated by a CNC machine drive signals are applied to at least an RPM Control Electronics Module to drive the rotation of a cutting tool and the infeed drive motor electronics. A solid state relay intercepts the infeed signal and is driven into an on off state by a Variable Frequency Generator. This causes the solid state relay to enter the on off state in response to the input frequency and interrupts the infeed signal applied to the infeed motor electronics in synchronization with the frequency generated. The frequency is user selectable and the frequency used to eliminate or minimize chip formation is dependant upon the material being drilled, the infeed rate, the RPM of the tool, and the diameter and point geometry of the tool so adjustment by the machine operator is required. This permits the user to vary the specific frequency to select a frequency which is suitable for elimination of spirals in a given set of circumstances. The interrupted or chopped infeed signal causes the downward motion of the RPM motor to be interrupted in conformance with the frequency generated. Since the infeed rate of the cutter tool is also momentarily interrupted the tool penetration is interrupted. This process causes the cutting tool head to rotate without penetration and cuts the forming spiral chip.

11 Claims, 3 Drawing Sheets

INTERRUPTIBLE FEED RATE DRILLING SYSTEM

BACKGROUND OF THE INVENTION

1. Field of the Invention

The Field of this invention relates to Automatic circuit board drilling machines and drilling machine systems. More specifically this invention relates to a specific drive signal systems which control the action of the drill tool.

2. Description of related art

During the drilling of holes in circuit boards, a spiral of cut material often forms as a spiral strand which often wraps around the cutting tool. When this occurs a portion of the spiral strand whips the top of the material being cut causing scratches and other abnormalities due to abrasive contact as the tool rotates and the wrapped strand continually strikes the surface. Such abnormalities are not suitable particularly for electronic circuit boards. In addition, as the wrapped material becomes tangled about the tool and interferes with other automatic functions such as automatic tool changing.

Several efforts have been made to solve the spiral cut chip material in current manufacturing methods. One of these solutions is to use a special cutting tool, which by specific point geometry is designed to prevent the spiraling wrap. Such special tools are expensive because additional manufacturing steps require special notches to be placed in the tip of the cutting edge. These notches prevent the spiral of material from forming by forcing a through cut of the spiral during the drilling of the hole. While this special tool does eliminate the problem of spiraling cuts or chips, the notches also prevent the tool from being sharpened when worn, which results in additional replacement costs.

Another solution currently used is to program the controller of the CNC which controls the drilling operation to the drill machine to drill holes twice. In this approach a first small hole is drilled with a non-wrap tool at a point along the anticipated circumference of the larger hole. That is the smaller tool is positioned such that the entirety of the hole will be inside the area of the larger hole with the circumference of the smaller hole tangential to the circumference of the larger hole. This in effect cuts the would be spiraling chip each revolution of the larger cutter because the spiral is interrupted at the point of tangent at the larger hole's edge by the edge of the smaller hole and cannot form. This solution, however, requires two machine operations for each hole and results in increased expense.

The instant invention provides a system which interrupts the infeed rate of the cutter momentarily, allowing the rotating cutter to complete one or more revolutions, cut the potential chip and prevent its formation. The interruption to the infeed rate is scheduled such that the amount of cut material is not enough to allow a spiral to form, therefore no wrapping of the cutting tool occurs.

SUMMARY OF THE INVENTION

The invention is a system which interrupts the infeed signal generated by a CNC machine or controller which provides drive signals to be applied to at least an RPM Control Electronics Module to drive the rotation of a cutting tool and the infeed signal to the infeed drive motor electronics. A solid state relay intercepts the infeed signal and is driven into an on off state by a Variable Frequency Generator. This causes the solid state relay to enter the on off state in response to the input frequency and interrupts the infeed signal applied to the infeed motor electronics in synchronization with the frequency generated. The frequency is user selectable and is dependant upon the material being drilled, the infeed rate, the RPM of the tool, and the diameter and point geometry of the tool. Accordingly, adjustment by the machine operator is necessary. This adjustment permits the user to vary the specific frequency to select a frequency which is suitable for elimination of spirals in a given set of circumstances. The interrupted or chopped infeed signal causes the downward motion of the spindle motor to be interrupted in conformance with the frequency generated. Since the infeed rate of the cutter tool is also momentarily interrupted thereby the tool penetration is interrupted. This interruption coupled with the continued rotation of the tool causes the cutting edge of the tool to change position thereby cutting the forming spiral chip thereby preventing the continuous formation thereof.

DESCRIPTION OF THE PREFERRED EMBODIMENT(S)

Figure 1:
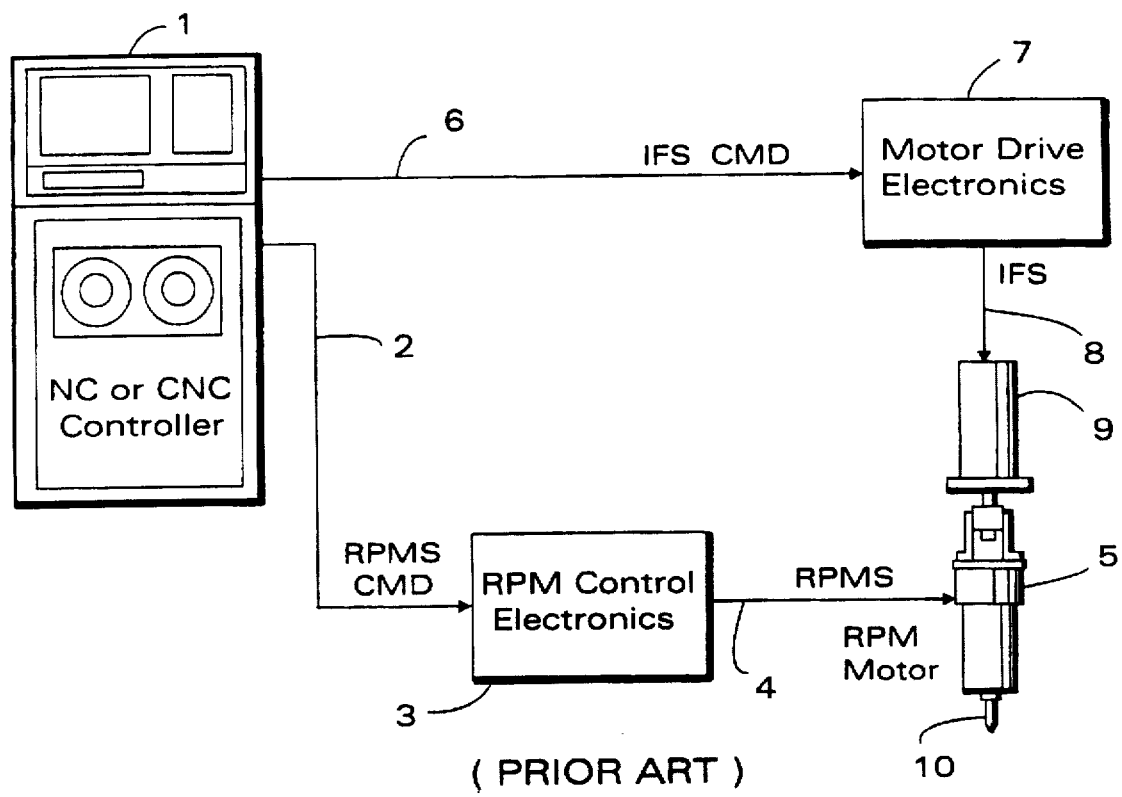
FIG. 1 is a block diagram of typical Drilling System Components.

FIG. 1 shows a CNC machine 1 which provides an RPM drive command signal RPM CMD to be applied through a cable 2 to an RPM Control Electronics Module 3 which feeds the RPM signal through a cable 4 to the RPM drive motor 5. FIG. 1 also shows the CNC machine 1 providing the infeed drive command signal IFS CMD through a cable 6 to Motor Drive Electronics Module 7 which feeds the IFS signal through a cable 8 to the infeed drive motor 9. Appropriate command signals cause the tool 9 to rotate at the commanded RPM and to be feed or retracted at the commanded infeed rate.

Figure 2:
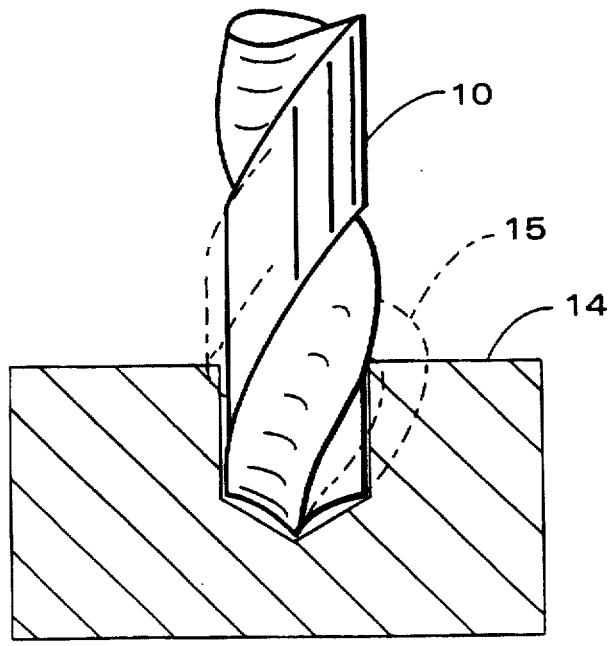
FIG. 2 is a side view of the tool forming a spiral chip.

FIG. 2 shows a tool 10 cutting material 14 and forming a spiral chip 15. If the chip 15 cut is not interrupted it will continue to form and wrap around the tool 10 with adverse results as pointed out above.

Figure 3:
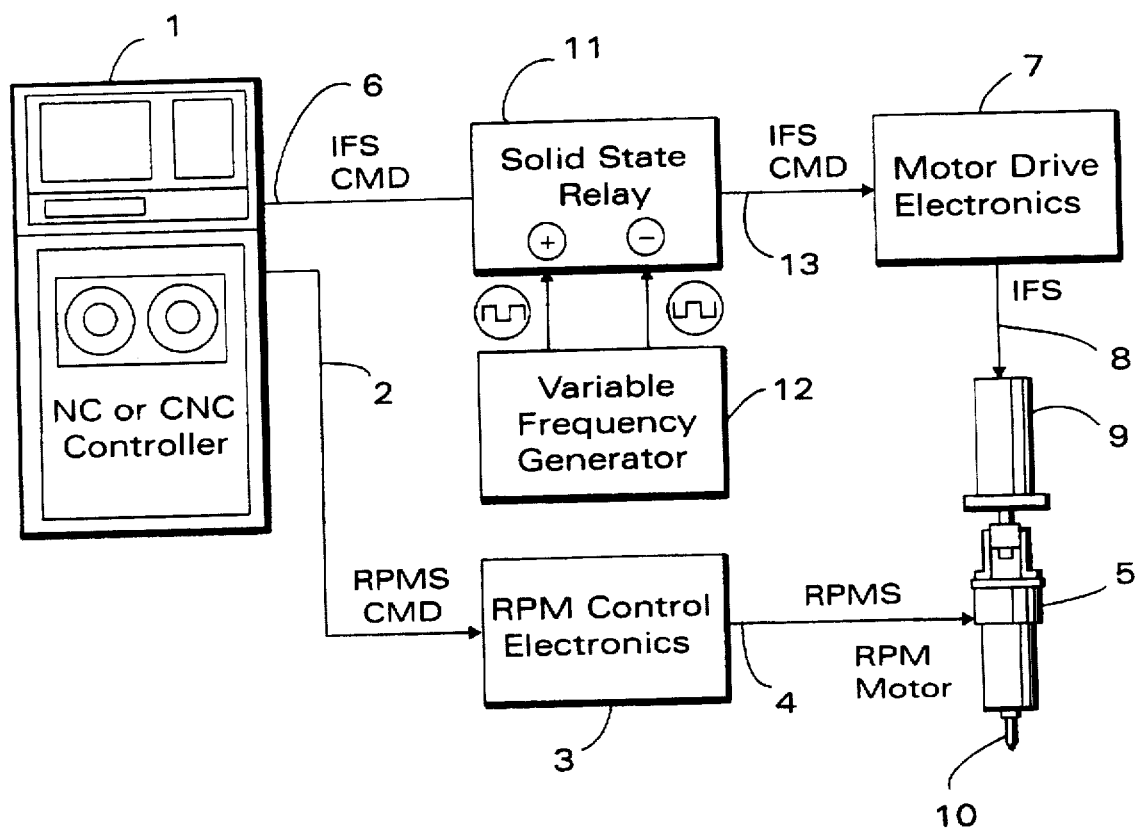
FIG. 3 is a block diagram of the Pulse Drilling System Components.

FIG. 3 shows the instant invention added to the system of FIG. 1. A solid state relay 11 receives the IFS CMD signal and interrupts the CMD signal in accordance with the input from a Variable Frequency Generator 12. A modified or chopped IFS' CMD signal is then fed by the Solid State Relay through a cable 13 to the Motor Drive Electronics Module 7.

The Solid State Relay 7 is driven into an on off state by the Variable Frequency Generator 8 which allows frequency generation to be varied from about 0 or DC which is the starting state to a cycle period of about 4 milliseconds or higher dependent upon the particular circumstances. In such drilling systems, the typical Chip Load factor which is the ratio of the Infeed Rate/RPM can range from 3.5 thousandths for metal to 8 thousandths for plastic. As pointed out above, the frequency used is dependant upon the material being drilled, the infeed rate, the RPM of the tool, and the diameter and point geometry of the tool so adjustment, through a continuously variable control knob or thumb wheel switch, by the machine operator is required. This allows the user to vary the specific frequency and select a frequency which is suitable for elimination of spirals in a given set of circumstances. Typically the frequency selected will vary with inversely with the Chip Load factor. The Solid State Relay 7 supplies a chopped Infeed Drive signal IFS' CMD in synchronization with the Frequency Generator 12 to the Motor Drive Electronics 7 which sends a drive signal IFS to the infeed motor 9. Since the interrupted or chopped infeed signal causes the downward motion of the RPM motor to be interrupted in conformance with the frequency generated, the infeed rate of the cutter tool 10 is also momentarily interrupted and the tool 10 penetration starts and stops in synchronization with the frequency generated. This operation does not give spiral chips an opportunity to form because each time tool penetration halts, the continued rotation of the tool causes the cutting edge of the tool to change position and cuts any previous chip formation because the original cut is not continuous.

FIG. 3 shows a square wave which biases the solid state relay 11 into an on off state. However, dependent on the threshold levels required for switching of the solid state relay, the Variable Frequency Generator could generate a sine wave which would still bias the solid state relay into the on off state with a variation in duty cycle dependent upon the threshold levels.

In fact, a change in the infeed rate which allows the cutting edge of the tool to cut the forming spiral can have the same effect as stopping the infeed in that the cutting edge of the tool cuts or breaks the forming spiral chip.

The signal levels output for the Motor Drive Electronics in such systems are typically measured in the range of plus or minus 10 volts and therefore the solid state relay described must be capable of handling such voltages at the drive currents. Selection of the particular relay will determine the electrical characteristics required of the Variable Frequency Generator. These Variable Frequency Generators would typically drive a transistor with a voltage of plus or minus 0.5 volts. The relay would typically require 24 volts. While specific voltage requirements have been described, the invention is not limited to such voltage requirements and implementations with other voltage levels dependent on the particular hardware selected could also be used to implement this invention. Accordingly, other systems with different power requirements which modify the infeed rate of a tool are considered within the scope of this invention.

Figure 4:
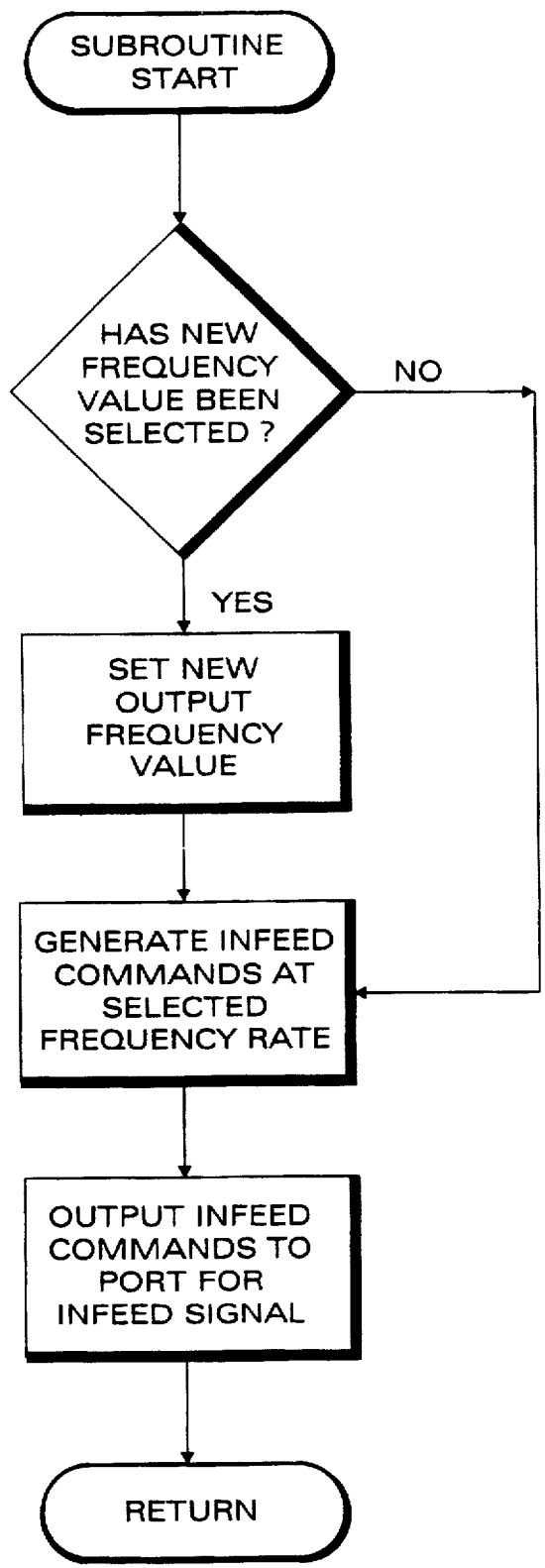
FIG. 4 is a flow chart of the interruption process for a CNC machine.

FIG. 4, shows a simplified flow chart of the software implementation of the pulse drilling system. Basically the current systems, as shown in FIG. 1, compute a feed rate based on a number of factors and have the capability of stopping the feed rate entirely and retracting. The software can be modified to accept a new command from the keyboard which the software uses to generate the chopped feed rate commands which are then sent to the Motor Drive Electronics 7. Other input devices in addition to a keyboard such as control knobs or thumb wheel switches could also be used for data input as well as a host of other input devices known in the art.

In operation, the operator may adjust the Variable Frequency Generator for any specific material being cut by the tool 10 until the frequency selected minimizes or eliminates the spiral strand.

Having thus described the invention, what is claimed is:

1. A drilling system including a tool, said drilling system comprising:
   a. at least one in-feed drive motor for feeding said tool;
   b. at least one tool drive motor for driving said tool;
   c. at least one controller for generating in-feed drive signals for controlling said in-feed motor;
   d. an electrical circuit for selectively changing the in-feed drive signal for the in-feed drive motor;
   e. a switch adapted for intercepting the in-feed drive signal generated by said controller and selectively outputting portions of said in-feed drive signal to said in-feed drive motor when said switch is operated; and
   f. an electrical oscillator for electrically controlling said switch.

2. A drilling system as described in claim 1 wherein said electrical oscillator is an adjustable variable frequency generator electrically coupled to said switch.

3. A drilling system as described in claim 2 wherein said switch is a relay having an on state and an off state.

4. A drilling system as described in claim 3 wherein said relay is a solid state relay electrically coupled to said variable frequency generator electrical circuit selectively interrupts the drive signal for the infeed drive motor.

5. A drilling system as described in claim 1 wherein said switch is a relay coupled to said electrical circuit.

6. A drilling system having at least one infeed drive motor and at least one tool drive motor for driving a cutting tool which comprises:
   a. at least one controller for generating drive signals;
   b. an electrical relay for selectively interrupting the infeed drive signal to said infeed drive motor in response to an externally generated signal; and
   c. an oscillator adapted for generating a range of selectable frequency signals coupled to said relay.

7. A drilling system as described in claim 6 wherein said oscillator is an adjustable variable frequency generator electrically coupled to said relay.

8. A drilling system having an infeed drive motor and a tool drive motor for driving a cutting tool which comprises:
   a. at least one controller for generating drive signals at least one of which is an infeed drive signal;
   b. an electrical relay for selectively interrupting the infeed drive signal to said infeed drive motor in response to said generated signal; and
   c. an adjustable variable frequency generator adapted for generating a range of selectable frequency signals coupled to said relay.

9. A computer controlled drilling system for drilling material comprising:
   a. at least one cutting tool;
   b. at least one drive motor for rotating said tool;
   c. at least one drive motor for in-feeding said cutting tool into the material to be drilled;
   d. means for in-putting selection data;
   e. means for determining from said selection data a frequency value for use in generating command signals;
   f. means for generating a series of command signals based on said frequency value; and
   g. means for out-putting said command signals to said in-feeding drive motor.

10. A computer controlled drilling system as described in claim 9 wherein said command signals are a series of pulses.

11. A computer controlled drilling system as described in claim 9 wherein said frequency value represents a square wave.

* * * * *